United States Patent [19]
Leung

[11] Patent Number: 5,940,034
[45] Date of Patent: Aug. 17, 1999

[54] DUAL RF AUTOTRACK CONTROL

[75] Inventor: Yat Fai Leung, Redwood City, Calif.

[73] Assignee: Space Systems/Loral, Inc., Palo Alto, Calif.

[21] Appl. No.: 09/131,250

[22] Filed: Aug. 8, 1998

[51] Int. Cl.[6] .................................. G01S 3/16; G01S 3/28
[52] U.S. Cl. ......................... 342/380; 342/383; 342/359
[58] Field of Search .................................... 342/359, 380, 342/381, 383, 384

[56] References Cited

U.S. PATENT DOCUMENTS 5,089,824  2/1992  Uematsu et al. ..................... 342/359
5,594,460  1/1997  Eguchi ................................. 342/359

*Primary Examiner*—Theodore M. Blum
*Attorney, Agent, or Firm*—Kenneth W. Float

[57] ABSTRACT

A system and method for RF autotracking multiple antennas to compensate for disturbances experienced by the antennas. The system and method uses two control algorithms implemented in fast and slow controllers and sums the result for each antenna that is tracked. One (fast) control algorithm corrects for rapid, common mode disturbances such as spacecraft motion disturbances, while the other (slow) control algorithm corrects for slower disturbances, such as thermal distortion, that do not affect all antennas in the same manner.

17 Claims, 2 Drawing Sheets

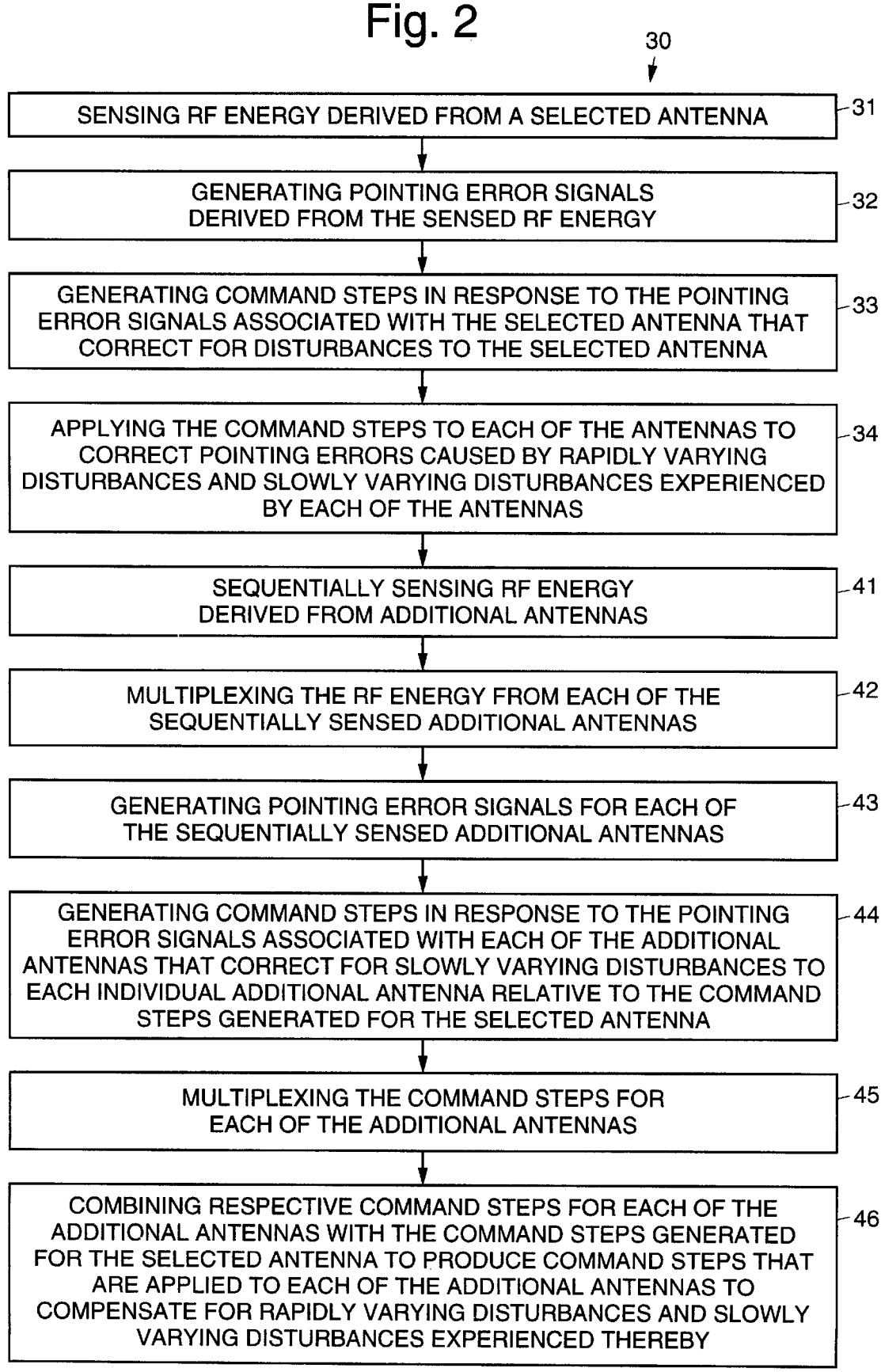

DUAL RF AUTOTRACK CONTROL

BACKGROUND

The present invention relates generally to spacecraft communication systems, and more particularly, to a dual autotrack control system and method for autotracking multiple antennas to compensate for disturbances to a spacecraft.

The assignee of the present invention manufactures and deploys communication satellites or spacecraft that use multiple communication antennas. RF autotracking controllers have heretofore been used to steer individual antennas to compensate for disturbances to the spacecraft. Furthermore, only single control algorithms were used to steer an antenna. Sensing and actuation occurred at a high rate to compensate for the fastest disturbance, such as spacecraft motion, which typically affect all the antennas on the spacecraft in the same manner.

More specifically, in prior systems that provide for RF autotrack control of multiple antennas, each antenna utilized a single control algorithm and a dedicated set of sensors to compensate for the most rapid disturbance. The most rapid disturbances are typically those common to all of the antennas on the spacecraft. Such rapid disturbances include spacecraft motion disturbances. The RF sensor was used to multiplex between the multiple antennas to save on hardware and software costs, but unfortunately at a cost of degrading the pointing performance of the antenna to the point where the common mode disturbances could not be corrected.

It would therefore be desirable to have an autotrack control system for use with multiple antennas that compensates for fast and slow disturbances experienced by a spacecraft. Accordingly, it is an objective of the present invention to provide for a dual autotrack control system and method for autotracking multiple antennas to compensate for disturbances to a spacecraft.

SUMMARY OF THE INVENTION

To accomplish the above and other objectives, the present invention provides for the use of two control algorithms and sums the result for each antenna that is tracked. One control algorithm corrects for rapid, common mode disturbances such as spacecraft motion disturbances, while the other control algorithm corrects for slower disturbances, such as thermal distortion, that do not affect all antennas in the same manner.

More specifically, one exemplary embodiment of the autotrack system comprises a dedicated RF sensor (such as an RF feed or feed array) for sensing RF energy derived from a dedicated antenna. A first pseudo-monopulse coupler (PSM) and tracking receiver generates tracking errors associated with the dedicated antenna. A fast controller generates commanded steps that correct for pointing errors associated with rapidly varying disturbances and slowly varying disturbances experienced by the dedicated antenna. The dedicated RF sensor (RF feed or feed array), first pseudo-monopulse coupler and tracking receiver and fast controller form one exemplary embodiment of a fast commnon-mode sensor and controller. Other embodiments of fast common-mode sensor and controllers may use gyro-based controllers, for example.

A plurality of RF feeds or feed arrays collect RF energy derived from a plurality of additional antennas. An input multiplexer multiplexes the outputs of the plurality of RF feeds or feed arrays. A second pseudo-monopulse coupler and tracking receiver generates pointing error signals derived from the plurality of multiplexed RF feeds or feed arrays. A slow controller generates commanded steps that correct for pointing errors associated with non-common mode disturbances (typically slowly varying disturbances) experienced by each of the additional antennas.

An output multiplexer multiplexes the outputs of the slow controller to provide individual signals associated with each of the plurality of additional antennas. A plurality of summing devices is coupled to receive the output of the fast controller, and the plurality of summing devices combine the commanded steps output by the fast controller and commanded steps output by the slow controller associated with each respective additional antenna and coupling the resultant command steps to the respective additional antenna.

One exemplary RF autotracking method comprises the following steps. RF energy derived from a selected antenna is sensed. Pointing error signals derived from the sensed RF energy are generated. Command steps are generated in response to the pointing error signals that correct for disturbances to the selected antenna. The command steps are applied to the selected antenna to correct pointing errors caused by rapidly varying disturbances and slowly varying disturbances experienced by the selected antenna.

RF energy derived from additional antennas is sequentially sensed. The RF energy from each of the sequentially sensed additional antennas is multiplexed. Pointing error signals for each of the sequentially sensed additional antennas are generated. Command steps generated are in response to the pointing error signals associated with each of the additional antennas that correct for slowly varying disturbances to each individual additional antenna relative to the command steps generated for the selected antenna. The command steps for each of the additional antennas are multiplexed. The respective command steps for each of the additional antennas are combined with the command steps generated for the selected antenna to produce command steps that are applied to each of the additional antennas to compensate for rapidly varying disturbances and slowly varying disturbances experienced thereby.

The present invention may be used to RF autotrack antennas, and thus remove or compensate for both rapidly varying disturbances or errors common to a group of antennas, and also independently compensate for slowly varying errors, using minimal hardware and software. Dramatic savings in these areas are achieved as the number of antennas to be corrected increases.

The present invention uses the summation of two control algorithms to provide for complete compensation. One algorithm compensates for rapid common-mode disturbances, while the other algorithm compensates for non-common-mode disturbances, such as thermal distortion, which tends to be very slow. The present invention allows for a sensor and controller to be multiplexed without significant pointing performance degradation while drastically reducing the hardware and software impact to the spacecraft if many antennas need to be corrected.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 is a flow diagram that illustrates an RF autotracking method in accordance with the principles of the present invention.

DETAILED DESCRIPTION

Figure 1:
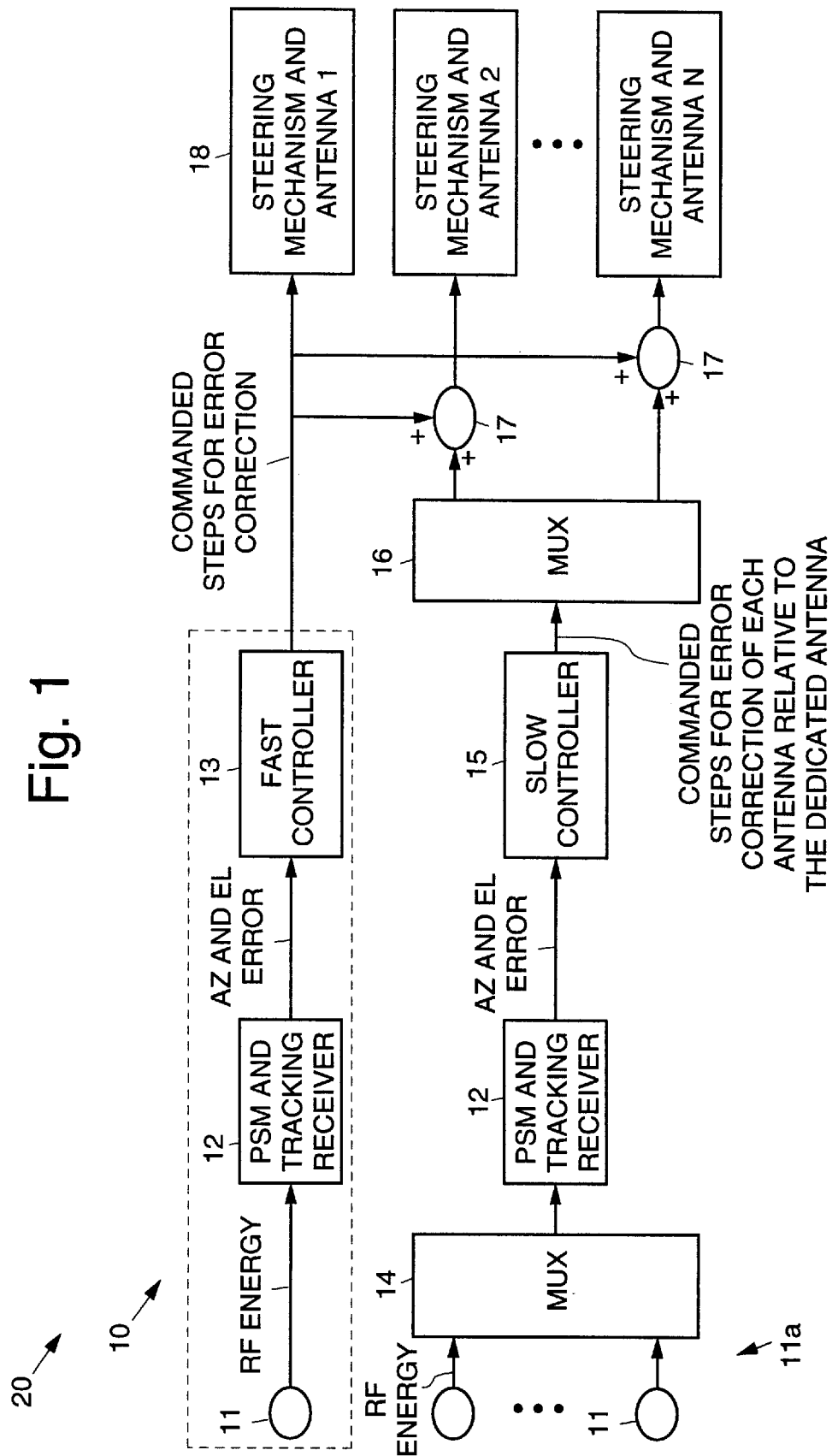
FIG. 1 illustrates a block diagram of an RF autotracking controller in accordance with the principles of the present invention.

Referring to the drawing figures, FIG. 1 illustrates a block diagram of an exemplary autotracking controller 10 in accordance with the principles of the present invention that may be employed on a spacecraft 20, for example. The autotracking controller 10 uses two control algorithms, respectively implemented in a fast autotracking controller 13 and a slow, multiplexed autotracking controller 15, to autotrack multiple antennas 18 disposed on the spacecraft 20, for example. The autotracking controller 10 is designed to controls and eliminate pointing errors resulting from common mode and non-common mode disturbances experienced by the antennas 18. In the context of the present invention, non-common mode disturbances are typically slower than common mode disturbances.

The fast controller 13 has its own dedicated RF sensor 11 and control hardware and software. The dedicated RF sensor 11 is coupled by way of a first pseudo-monopulse coupler (PSM) and tracking receiver 12 to the fast controller 13. The dedicated RF sensor 11 used by the fast controller 13 is dedicated to one of the antennas 18 that is RF autotracked (the dedicated antenna 18). The first pseudo-monopulse coupler and tracking receiver 12 outputs azimuth and elevation error signals associated with the dedicated antenna 18. The output of the fast controller 13 comprises commanded steps (correction signals) that correct the errors detected by the RF sensor 11. These commanded steps track out the common mode error, such as motion of the spacecraft 20 that affects all of the antennas 18 as well as the non-common mode errors that affect the antenna 18 sensed by the dedicated RF sensor 11.

In general, the present invention uses a fast common-mode sensor and controller, of which the dedicated RF sensor 11, first pseudo-monopulse coupler and tracking receiver 12, and fast controller 13 forms an exemplary embodiment. Alternative embodiments of the fast common-mode sensor and controller may readily be employed, such as those that use gyro-based controllers, for example. Accordingly, the present invention is not limited only to the use of the disclosed dedicated RF sensor 11, the pseudo-monopulse coupler and tracking receiver 12 and fast controller 13, but provides for the use of any common-mode sensing arrangement.

A plurality of RF feeds 11 or feed arrays 11 (sensors 11) are coupled by way of an input multiplexer 14 and a second pseudo-monopulse coupler and tracking receiver 12 to the slow controller 15. The plurality of RF feeds 11 or feed arrays 11 collect RF energy derived from the plurality of additional antennas 18. The output of the slow controller 15 is coupled by way of an output multiplexer 16 to a plurality of summing devices 17. Outputs of each of the summing devices 17 is coupled to an individual antenna 18 and couples compensation signals (commanded steps) thereto.

The output of the fast controller 13 is coupled to all of the antennas 18 that are autotracked by way of the plurality of summing devices 17. The dedicated antenna 18 sensed by the dedicated RF sensor 11 is steered correctly. However, the other antennas 18 are not fully compensated for by the command steps associated with the dedicated antenna 18, since disturbances affect these other antennas 18 differently than the dedicated antenna 18 sensed by the dedicated RF sensor 11. Consequently, disturbances affecting the other antennas 18 are not corrected solely by the compensation signals generated by the fast controller 13 for the dedicated antenna 18. An example of such disturbances is thermal distortion. Fortunately, these disturbances are typically very slow compared to the common mode errors.

To correct for these slowly varying errors, the slow controller 15 multiplexes between the other antennas 18 that are not sensed by the fast controller 13. This is achieved using the input multiplexer 14 to sequentially sense the antenna patterns of each of the other antennas 18, and the output multiplexer 16 and summing devices 17 coupled between the slow controller 15 and the other antennas 18 that are to be compensated. Thus, periodically, the RF sensors 11 are cycled through and sense all the antenna patterns.

The slow controller 15 then computes correcting command steps for the antenna 18 that is currently sensed by the associated RF sensor 11 relative to the dedicated antenna 18. The output of the slow controller 15 comprises commanded steps that correct for any error between the antenna 18 controlled by the fast controller 13 and the antenna 18 currently sensed by the slow controller 15.

The output (correcting command steps for the antenna 18 that is sensed) output by the slow controller 15 is then summed with the output (correcting command steps for the dedicated antenna 18) provided by the fast controller 13. In this fashion, all the pertinent disturbances that are typically seen by each individual antenna 18 are corrected using minimal hardware and software resources.

FIG. 2 is a flow diagram that illustrates an exemplary RF autotracking method 30 in accordance with the principles of the present invention. The RF autotracking method 30 comprises the following steps.

RF energy derived from a selected (dedicated) antenna 18 is sensed 31 by an RF sensor 11. Pointing error signals (azimuth and elevation pointing errors) are generated 32. Command steps are generated 33 in response to the pointing error signals that correct for disturbances to the selected antenna 18. The command steps are applied 34 to the selected antenna 18 to correct pointing errors caused by both rapidly varying disturbances and slowly varying disturbances experienced by the selected antenna 18.

RF energy derived from additional antennas 18 are sequentially sensed 41 by an additional plurality of RF sensors 11. The RF energy from each of the additional antennas 18 is multiplexed 42 and processed to generate 43 pointing error signals (azimuth and elevation pointing errors) for each of the additional antennas 18. Command steps are generated 44 in response to the pointing error signals associated with each of the additional antennas 18 that correct for slowly varying disturbances each individual additional antenna 18 relative to the correction (command steps) generated for the selected antenna 18. These command steps correct for the slowly varying disturbances experienced by each additional antenna 18. The command steps for each of the additional antennas 18 are multiplexed 45 and are respectively combined 46 with the command steps generated for the selected antenna 18 to produce command steps that are applied to each of the additional antennas 18 to compensate for rapidly varying disturbances and slowly varying disturbances.

Thus, a dual RF autotrack control system and method for RF autotracking multiple antennas to compensate for rapidly and slowly varying disturbances to a spacecraft have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. An autotrack control system for autotracking multiple antennas to compensate for disturbances thereto, comprising:

a common mode sensor for sensing common mode disturbances experienced by a dedicated antenna;

a first controller for generating correction signals that correct for pointing errors associated with the common mode disturbances experienced by the dedicated antenna;

a plurality of sensors for sensing non-common mode disturbances experienced by a plurality of additional antennas;

a second controller for generating correction signals that correct for pointing errors associated with the non-common mode disturbances experienced by each of the additional antennas;

a plurality of summing devices for combining the signals output by the first controller and signals output by the second controller associated with each respective additional antenna and for coupling the combined signals to the respective additional antennas.

2. The system recited in claim 1 wherein the common mode sensor and first controller comprises:

a dedicated RF sensor;

a processor for generating tracking errors associated with the dedicated antenna; and a first controller generating commanded steps that correct for pointing errors associated with disturbances experienced by the dedicated antenna.

3. The system recited in claim 1 further comprising input and multiplexers respectively coupled between the plurality of sensors and the second controller, and between the second controller and the plurality of summing devices.

4. The system recited in claim 2 further comprising a first pseudo-monopulse coupler and tracking receiver coupled between the dedicated RF sensor and the first controller for generating tracking errors associated with the dedicated antenna.

5. The system recited in claim 4 further comprising a second pseudo-monopulse coupler and tracking receiver coupled between the input multiplexer and the second controller for generating tracking errors associated with each of the additional antennas.

6. The system recited in claim 1 which is disposed on a spacecraft.

7. The system recited in claim 4 wherein the first pseudo-monopulse coupler and tracking receiver outputs azimuth and elevation error signals associated with the dedicated antenna.

8. The system recited in claim 1 wherein the correction signals generated by the first controller track out common mode errors, and non-common mode errors that affect the dedicated antenna.

9. The system recited in claim 6 wherein the common mode errors comprise perturbations to the motion of the spacecraft that affects all antennas, and wherein the non-common mode errors comprise perturbations that affect the dedicated antenna.

10. The system recited in claim 8 wherein the common mode errors comprise perturbations that affects all antennas, and wherein the non-common mode errors comprise perturbations that affect the dedicated antenna.

11. A method for autotracking multiple antennas to compensate for disturbances experienced by the antennas, comprising the steps of:

sensing common mode disturbances experienced by a selected antenna;

generating correction signals that correct for pointing errors associated with the common mode disturbances experienced by the selected antenna;

applying the correction signals to each of the antennas to correct pointing errors caused by the common mode disturbances experienced by each of the antennas;

sensing non-common mode disturbances experienced by additional antennas;

generating correction signals that correct for the non-common mode experienced by each of the additional antennas relative to the signals generated for the selected antenna; and combining respective correction signals generated for each of the additional antennas with the correction signals generated for the selected antenna to produce signals that are applied to each of the additional antennas to compensate for common mode and non-common mode disturbances experienced thereby.

12. The method recited in claim 11 wherein the step of sensing common mode disturbances experienced by a selected antenna comprises the steps of:

sensing RF energy derived from the selected antenna; and generating pointing error signals derived from the RF energy sensed by the selected antenna.

13. The method recited in claim 11 where in the step of sensing common mode disturbances experienced by additional antennas comprises the steps of:

sequentially sensing RF energy derived from the additional antennas;

multiplexing the RF energy from each sequentially sensed antennas; and generating pointing error signals for each of the sequentially sensed antennas.

14. The method recited in claim 13 further comprising the step of multiplexing the correction signals for each of the additional antennas before they are combined.

15. A method for RF autotracking multiple antennas to compensate for disturbances experienced by the antennas, comprising the steps of:

sensing RF energy derived from a selected antenna;

generating pointing error signals derived from the RF energy sensed by the selected antenna;

generating command steps in response to the pointing error signals associated with the selected antenna that correct for disturbances to the selected antenna;

applying the command steps to each of the antennas to correct pointing errors caused by the disturbances experienced by each of the antennas;

sequentially sensing RF energy derived from additional antennas;

multiplexing the RF energy from each sequentially sensed antennas;

generating pointing error signals for each of the sequentially sensed antennas;

generating command steps in response to the pointing error signals associated with each of the additional antennas that correct for disturbances to each individual additional antenna relative to the command steps generated for the selected antenna;

multiplexing the command steps for each of the additional antennas; and combining respective command steps for each of the additional antennas with the command steps generated for the selected antenna to produce command steps that are applied to each of the additional antennas to compensate for disturbances experienced thereby.

16. The method recited in claim 15 wherein the pointing error signals comprise azimuth and elevation pointing error signals.

17. The method recited in claim 15 wherein the commanded steps that are generated track out common mode errors, and non-common mode errors that affect the dedicated antenna.

* * * * *